March 21, 1950  W. W. HANSEN  2,500,945
MODULATORS AND FREQUENCY CHANGERS
Filed Nov. 8, 1943  3 Sheets-Sheet 1

INVENTOR
WILLIAM W. HANSEN
BY Paul B. Hunter
ATTORNEY

Patented Mar. 21, 1950

2,500,945

UNITED STATES PATENT OFFICE 2,500,945

MODULATOR AND FREQUENCY CHANGER

William W. Hansen, Garden City, N. Y., assignor to The Sperry Corporation, a corporation of Delaware Application November 8, 1943, Serial No. 509,426

32 Claims. (Cl. 332—7)

The present invention is related to the art including modulators and frequency changers, especially adapted for use with ultra-high frequencies of the order of 3,000 megacycles per second, or higher.

The present case is a continuation-in-part of my prior copending application, Serial No. 451,796, filed July 21, 1942. In this prior application, a number of plural-beam velocity modulation electron discharge devices are shown, which are adapted to operate as ultra-high frequency push-pull or push-push amplifiers, or oscillators. The present invention constitutes an improvement over the invention disclosed in this prior application, and provides either a carrier-suppressed modulated output wave or a single sideband modulated output wave or a frequency-shifted output wave, by the use of amplitude modulation, phase modulation or combined phase and amplitude modulation in plural-beam electron discharge devices of the type disclosed in the prior application.

Accordingly, it is an object of the present invention to provide improved ultra high frequency modulators or frequency changers.

It is another object of the present invention to provide improved balanced modulators or frequency changers utilizing a plurality of velocity modulated electron beams.

It is another object of the present invention to provide improved high frequency changers or modulators utilizing velocity modulation electron discharge devices with amplitude, amplitude-independent or combined amplitude and amplitude-independent modulation of the electron beams thereof.

It is a further object of the present invention to provide improved modulators or frequency changers utilizing plural-beam electron discharge tubes with amplitude, phase or combined phase and amplitude modulation thereof.

Further advantages of the present invention will become apparent from the following specification and drawings, wherein.

Figure 1:
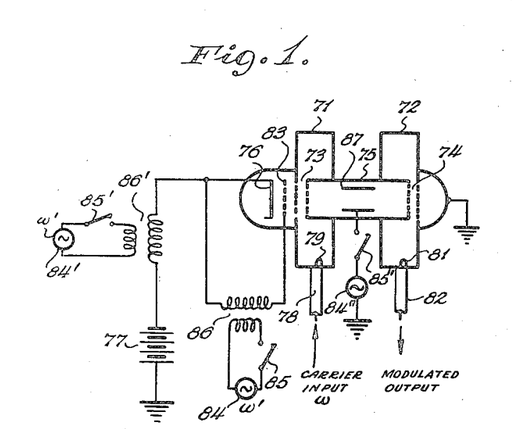
Fig. 1 shows a schematic wiring diagram of a velocity modulation modulator useful in explaining the present invention.

Fig. 1 illustrates a modulator of the velocity modulation type. Such a velocity modulation device comprises a pair of cavity resonators 71 and 72 arranged to provide a pair of electron permeable gaps 73 and 74 separated by a field-free drift space provided by a drift tube 75. Each of these gaps is formed by a pair of electron permeable grids forming part of the opposed walls of the resonators. An electron beam from a cathode 76 is projected successively through gap 73, drift tube 75, and gap 74 by means of the battery 77 or other accelerating voltage source, as has been described in Varian Patent No. 2,242,275, granted May 20, 1941. In such a device the electron beam has its electron velocities periodically varied or modulated at gap 73. These velocity-modulated electrons form groups or bunches upon traversing the drift space 75, and thereafter give up high frequency energy to the output resonator 72. A suitable high frequency wave, preferably of the radian frequency $\omega$ at which resonator 71 is resonant, may be supplied thereto by way of a suitable input transmission line 78 and coupling loop 79. Similarly, high frequency energy of this predetermined frequency $\omega$ may be abstracted from resonator 72, tuned to this frequency, by means of its coupling loop 81 and output transmission line 82.

The device thus far described operates essentially as an ultra high frequency amplifier, as described in this Varian Patent No. 2,242,275. In order to modulate the output of the device, for example, by a suitable modulation radian frequency $\omega'$, a control grid 83 may be provided between cathode 76 and the entrance or accelerating grid of the resonator 71. Control grid 83 serves in well-known manner to control the electron beam current intensity or density. Modulating voltages of the desired modulating frequency $\omega'$ derived from a suitable source 84 are impressed between the control grid 83 and cathode 76, as by way of a coupling transformer 86, when switch 85 is closed. In this way the electron beam current is periodically varied in intensity at the frequency $\omega'$; that is, is density modulated at frequency $\omega'$. By this action, as is described in Hansen and Varian Patent No. 2,281,935 granted May 5, 1943, the output energy derived from resonator 72 is amplitude modulated at the frequency $\omega'$.

Although the modulating voltage will be illustratively discussed throughout this specification as a single frequency $\omega'$, it is to be understood that any modulating signal, including complex wave forms such as voice currents, may be utilized in any of the modifications to be described. The frequencies of the modulating voltage components may have any value, low or high, but are preferably of a lesser order of magnitude than the frequency $\omega$.

Figure 2:
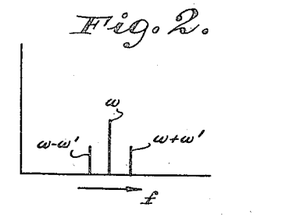
Figs. 2 and 3 are frequency spectrum diagrams for explaining Fig. 1.

Fig. 2 illustrates the frequency spectrum of the modulated output, derived from line 82 and having a carrier frequency component of frequency $\omega$, and upper and lower side band components, respectively, of frequencies $\omega+\omega'$ and $\omega-\omega'$.

Instead of producing amplitude modulation of the output, other forms of modulation may also be produced, such as phase modulation. For this purpose, the source 84' of modulation frequency $\omega'$ (when switch 85' is closed) may be coupled by transformer 86' in series with the cathode circuit of the apparatus so that the accelerating voltage impressed between the cathode 76 and the grounded entrance grid of resonator 71 will vary periodically at the frequency $\omega'$. In this manner, when the carrier frequency energy of radian frequency $\omega$ is applied to resonator 71 as before, the output derived from resonator 72 will be phase modulated. This output will then have the frequency spectrum shown in Fig. 3, having a carrier component of frequency $\omega$ and a multiplicity and theoretically infinite number of side band components of frequency $\omega \pm n\omega'$, where $n$ is the order of the side band component, and the plus sign is used for upper side band components and the minus sign for lower side band components. As is well known in the theory of phase modulation, by proper choice of the modulating voltage, that is, of the secondary voltage of transformer 86', any one of the component frequencies of the wave illustrated in Fig. 3 may be suppressed, that is, made zero in amplitude, or may be maximized.

As still another way of producing phase modulation in the output of the device, recourse may be had to a control electrode or cylinder 87 located within the drift tube 75. When the modulating potentials of frequency $\omega'$, derived from source 84'', when switch 85'' is closed, are impressed on electrode 87, the transit time of the electrons between the gaps 73 and 74 is periodically varied, thus producing phase modulation of the output high frequency wave in the manner described in the above-mentioned Hansen and Varian Patent No. 2,281,935. Phase modulation may also be produced by separating drift tube 75 into two insulated parts and impressing the modulating potentials between these parts.

Figure 3:
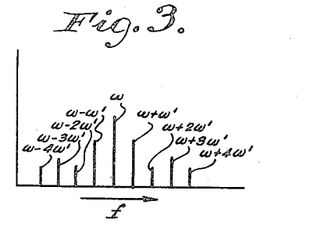

Instead of utilizing the device as a modulating amplifier, the input line 78 may be omitted and the resonator 72 coupled back to the resonator 71. In this way a regenerative oscillator device is produced. In such a device, modulation by control grid 83 will still produce amplitude modulation as before. However, modulation by variation of the accelerating voltage or by use of the transit time control electrode 87 or split drift tube will now produce frequency modulation of the output high frequency wave instead of phase modulation as described above. The frequency spectrum produced by such frequency modulation will still be as shown by Fig. 3, with some difference in the amplitudes of the individual carrier or side band components. Again, any particular side band or carrier component may be maximized or suppressed by the proper choice of amplitude of the modulating potential.

The above description with respect to Figs. 1 to 3 will serve as a basis for the present invention, which utilizes these principles to provide improved ultra high frequency balanced modulators or single-side band modulators or frequency changers, shifters, or converters.

Figures 4, 5, 6, 7:
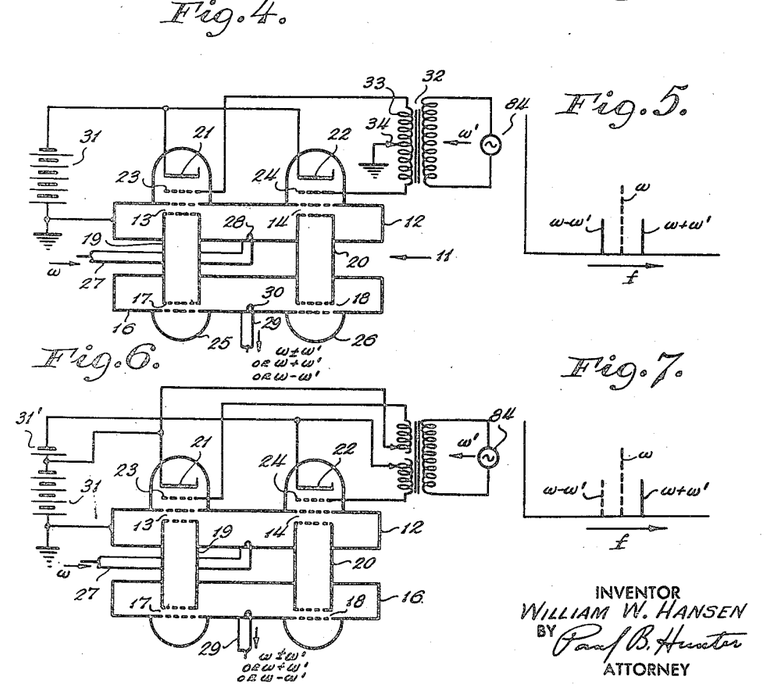
Fig. 4 illustrates a schematic wiring diagram of one embodiment of the present invention.
Fig. 5 shows a frequency spectrum diagram for the device of Fig. 4.
Fig. 6 illustrates a similar schematic diagram of a modification of Fig. 4.
Fig. 7 shows a similar frequency spectrum diagram.

Fig. 4 illustrates one form of the device which may be utilized as a balanced modulator or frequency changer. In this figure there is shown schematically a double-beam velocity modulation electron discharge device 11 of the type illustrated in Figs. 1 and 2 of the above-mentioned prior application Serial No. 451,796, and described more completely therein. This device 11 comprises a "buncher" or input resonator 12 having a pair of electron permeable gaps 13 and 14. A second output or "catcher" resonator 16 is provided, having a pair of similar gaps 17 and 18. The gaps 13 and 17 are joined by a drift tube 19 and the gaps 14 and 18 are similarly joined by drift tube 20, these drift tubes providing field-free spaces. Each of the gaps is defined by a pair of electron permeable walls or grids forming portions of the walls of the respective resonators 12 and 16. A pair of cathodes 21 and 22 is provided for projecting electron beams respectively through gap 13, drift tube 19, and gap 17, and through gap 14, drift tube 20 and gap 18. Respective control grids 23 and 24 are provided in the path of the beams from cathodes 21 and 22 for controlling the current density or intensity of the respective electron beams. The respective beams of electrons are projected from cathodes 21 and 22 to the collectors 25 and 26, respectively, by means of a suitable source of unidirectional potential such as battery 31. These beams may be collected by impinging upon the end walls 25 and 26 of the device, or any other suitable collecting means may be provided. It will be seen that, because of the equal accelerating voltages, the respective beams will have equal transit times between their respective pairs of gaps 13—17 and 14—18.

Ultra high carrier frequency energy of the carrier frequency $\omega$ to be modulated may be supplied to the input resonator 12 through an input connection shown as being in the form of a concentric transmission line 27 having a coupling loop 28 for coupling to the electromagnetic field in the resonator 12. A similar high-frequency energy conductor 29, having a coupling loop 30, is provided for abstracting ultra high frequency energy from the output resonator 16. As will be shown below, this output energy may be in the form either of a carrier-suppressed modulated wave having a nominal carrier frequency corresponding to that of the energy supplied by way of line 27, or of a single frequency wave having predetermined frequency difference with respect to the input wave.

As is discussed more in detail in the above-mentioned prior application, resonators such as 12 or 16 may be arranged, by suitable selection of size, shape and position of coupling loops 28 or 30, to resonate at the input frequency $\omega$ in either of two modes, which have different resonant frequencies for the same resonator construction. In one mode, the electric fields of the two gaps of the resonator, for example gaps 13 and 14 of resonator 12, or gaps 17 and 18 of resonator 16, may vary in phase coincidence; that is, they may have instantaneously similar intensities and polarities, similarly affecting the electron beams passing therethrough. In the second mode, the electric fields have opposite instantaneous polarities, so that at any one instant the electrons of the two beams are affected oppositely, one beam having its electrons accelerated and the other having its electrons decelerated.

In the first embodiment of the invention, illustrated in Fig. 4, resonator 12 is arranged to be excited by line 27 to resonate at frequency ω in the second mode discussed above, such that the instantaneous electric fields at the gaps 13 and 14 have opposite polarity or direction. Resonator 16, however, is arranged to be excited by the two electron beams in the first mode, having instantaneous like polarities or directions of electric field at the gaps 17 and 18. This is done by selecting the size and shape of resonators 16 or 12 to be resonant at the output frequency only when oscillating in the desired mode.

In operation, the input field, as at gap 13, periodically varies the velocities of the electrons of the beam passing therethrough. This velocity-varied beam travels through the field-free drift space defined by drift tube 19 which permits the faster electrons thereof to overtake the slower electrons and to form bunches or groups of electrons, so that the electron current is intensity or density modulated. The center of such a bunch or group may be considered to be formed by an electron of average or normal velocity; that is, one which passes through the gap 13 at the instant when the field therein is zero (so that this electron is neither accelerated or decelerated) and when the field is of a polarity such that the electrons immediately following this normal velocity electron are accelerated. In this way, this normal velocity electron will form the nucleus of the bunch. Normal velocity electrons entering the field a half-cycle later do not form part of a bunch, but are in "rarefactions" between bunches. The bunched electrons then pass through the output or energy-extracting gap, such as 17, to which they give up energy, provided the field existing at the output gap is in a proper direction to oppose the flow of the bunched electrons.

Let it be assumed that the beam emanating from the cathode 21 is suitably velocity modulated at gap 13 at or near the resonant frequency ω of resonator 12, by the energy supplied over line 27, and that the drift tube transit time is so selected, by selecting the accelerating voltage of battery 31 in relation to the drift tube length, that upon reaching the output gap 17 this beam efficiently gives up high frequency energy to resonator 16, tending to maintain resonator 16 in oscillation. Simultaneously, however, the beam emanating from cathode 22 is velocity modulated in opposite carrier frequency phase at gap 14. That is, at the instant the normal velocity electron forming the center of a bunch passes through gap 13, a similar normal velocity electron will pass through gap 14. This latter electron, however, will not form the center of any bunch, but rather will form the center of the rarefaction of electrons between the electron bunches of its beam. The bunches of electrons in the beam from cathode 22 will therefore be produced a half-period later in time than the corresponding bunches of the beam from cathode 21. If the field at gap 17 is proper to abstract energy from the bunched beam from cathode 21, then a half-period later the field at gap 18, which has the same direction as that at 17, will be reversed in polarity from that necessary to abstract energy from the beam emanating from cathode 22. It is at this instant that the bunches of this latter beam reach gap 18. Accordingly, instead of abstracting energy from the beam at gap 18, this field gives up energy to the beam, and, in fact, gives up the same amount of energy which it received a half-period earlier from the beam from cathode 21. Accordingly, the effects of the two beams neutralize one another with respect to resonator 16, so that even though resonator 12 be excited at the frequency ω, no output will be produced from resonator 16 under these conditions. It is this operation which permits the device to suppress the carrier component of its modulated output wave.

A carrier-suppressed output may now be derived by oppositely amplitude modulating the two electron beams. This is done in the present instance by supplying the modulating waves from source 84, of circular or radian frequency ω' for example, in opposite phase to the modulating or control grids 23 and 24 by means of a suitable transformer 32 having a center-tapped secondary winding 33 with its center tap 34 connected to ground, and with the outside terminals connected to the grids 23 and 24, respectively. If desired center-tap 34 could be connected directly to cathodes 21 and 22, with a suitable change of secondary winding voltage. The tap 34 may be made adjustable where differential adjustment of the two modulating voltages is desired.

That this circuit will now produce a carrier suppressed output may be seen from the following considerations. As discussed above, in the absence of modulating voltage, the oscillations set up in the output resonator by one of the beams during one-half period of the frequency ω are cancelled by the other beam during the subsequent half-period. However, by the push-pull density modulation of the two beams, this cancellation is completed only at the instants at which the modulating voltage is instantaneously zero. When one grid has a positive modulating voltage, its beam has greater current intensity and will set up a higher oscillation amplitude in the resonator in one carrier frequency half-cycle than the other beam cancels in the succeeding carrier frequency half-cycle, producing an energization of output resonator 16 of predetermined phase. Conversely, for the other half-period of the modulating voltage, the oscillations in resonator 16 will have opposite ultra high frequency phase, because the action of the second beam then predominates. This will be seen to be energization of resonator 16 by a carrier-suppressed modulated wave.

This may also be seen by the following analytical considerations. If the electric field at gap 13 is represented by the wave cos ωt, then that a gap 14 is represented by the wave cos (ωt+180). Because of the push-pull amplitude modulation by grids 23, 24, the respective beam currents at gaps 17, 18 will have wave forms represented by $$(1+m \cos \omega't) \cos \omega t \qquad (1)$$

and $$[1+m \cos (\omega't+180)] \cos (\omega t+180) \qquad (2)$$

where $m$ is the amplitude modulation factor, or percentage modulation, and a constant phase angle due to transit time through the drift tubes has been ignored.

Since the fields at gaps 17 and 18 are in phase, the amplitude of oscillation in resonator 16 due to the two beams is represented by the sum of (1) and (2), or is given by $$[1+m \cos \omega't] \cos \omega t + [1+m \cos (\omega't+180)] \cos (\omega t+180)$$
$$= 2m \cos \omega't \cos \omega t$$
$$= m \cos (\omega+\omega')t + m \cos (\omega-\omega')t \quad (3)$$

which will be clearly recognized as a carrier suppressed wave, illustrated in Fig. 5. The dotted line in Fig. 5 shows the location of the suppressed or nominal carrier frequency $\omega$. The factor $m$ may be adjusted to a suitable value, preferably unity, by adjusting or selecting the amplitudes of the modulating potentials applied to grids 23, 24.

The apparatus of Fig. 4 will operate in exactly the same manner if the resonators 12 and 16 are interchanged. That is, resonator 12 now may operate with like phases of electric field at its gaps 13, 14, and resonator 16 with opposite phases of electric field at its gaps 17, 18. Then the velocity modulation imposed on the two beams will both be in accordance with $\cos \omega t$, and the two beam currents will be $$(1+m \cos \omega't) \cos \omega t \quad (1a)$$

and $$[1+m \cos (\omega't+180)] \cos \omega t \quad (2a)$$

Resonator 16 now effectively subtracts these waves, since its gaps 17, 18 have opposite phase, so that the resultant excitation of resonator 16 is $$(1+m \cos \omega't) \cos \omega t - [1+m \cos (\omega't+180)] \cos \omega t$$
$$= 2m \cos \omega't \cos \omega t$$
$$= m \cos (\omega+\omega')t + m \cos (\omega-\omega')t \quad (3a)$$

as before.

It will be apparent that, using equal drift space transit times, it is only necessary that the two resonators 12 and 16 oscillate in respectively different modes.

Fig. 6 illustrates a modification of the device of Fig. 4, in which unequal drift tube transit times are utilized. In Fig. 6, resonators 12 and 16 are arranged to oscillate in the same mode, at frequency $\omega$. This mode may be either with like fields at their gaps or with opposite fields at the gaps, but for explanatory purposes, the fields at the pair of gaps of each resonator will be considered to have like phase. Also, an auxiliary battery 31' is connected in series with cathode 22 but not with cathode 21. Hence the beam will pass more swiftly along drift tube 20 than along tube 19. Battery 31' is so selected that the difference in electron transit times of the two beams is one half-period of the frequency $\omega$. In this manner, since the two beams are velocity modulated in like phase, the bunches formed arrive at gap 17 one half-period later than at gap 18, producing a 180° phase shift between the $\omega$-frequency components of the beam currents. These currents at the gaps 17, 18 are thus given by the expressions $$(1+m \cos \omega't) \cos \omega t \quad (1b)$$

and $$[1+m \cos (\omega't-180)] \cos (\omega t-180) \quad (2b)$$

which will be seen to be the same as in (1) and (2). Since resonator 16 is excited in accordance with the sum of these currents, the same suppressed-carrier output is derived as in the preceding modifications of the invention.

As stated above, in the device of Fig. 6 both resonators 12 and 16 may be arranged to operate with opposite polarity fields at their gaps, to produce the same output as above.

In Fig. 6, the difference in drift tube transit times may be produced in any desired manner. For example, an electrode similar to 87 of Fig. 1 may be used in one or both drift tubes 19 and 20. By suitable adjustment of fixed potentials impressed on such electrodes, the proper transit times may be obtained without the use of battery 31'. Alternatively, drift tubes 19 and 20 may be formed in two insulated sections across which suitable fixed potentials are impressed, which will also control the transit times through the drift tubes.

Figures 8, 9, 11, 16:
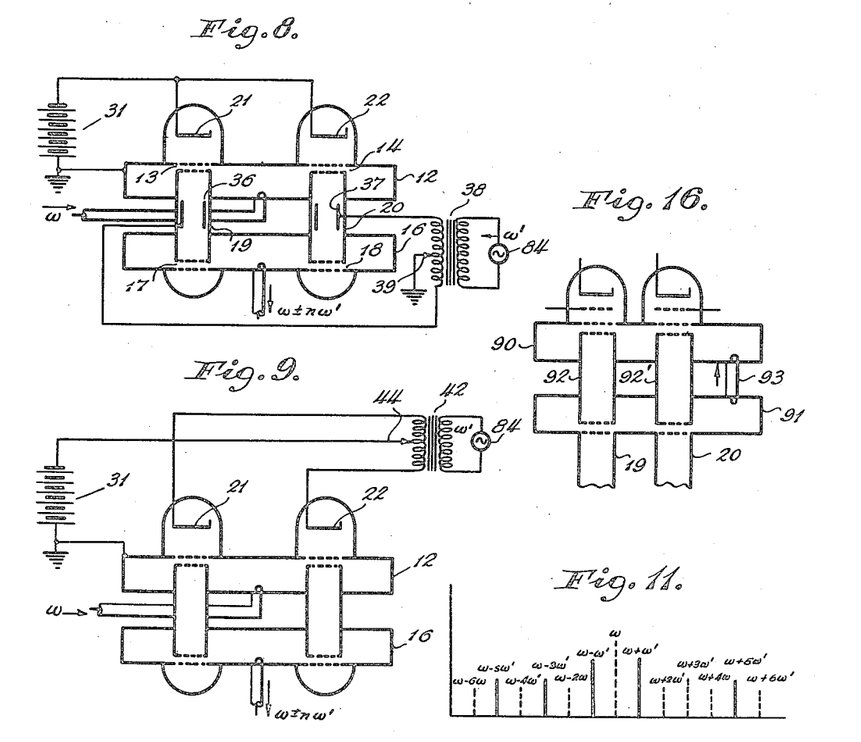
Figs. 8, 9 and 10 show schematic diagrams of further modifications of the invention.
Fig. 11 shows a similar explanatory frequency spectrum diagram.
Fig. 16 shows a schematic diagram of a modification of a portion of the devices of the preceding embodiments.

A similar result may be produced, according to the present invention, by phase modulation instead of amplitude modulation. Thus, instead of utilizing grids 23 and 24 to modulate the current density of the beam, and thereby produce amplitude modulation of the input carrier frequency, as in Fig. 4, a pair of phase-modulating electrodes 36 and 37, similar to electrode 87 of Fig. 1, may be located within the drift tubes 19 and 20, as shown in Fig. 8. Resonator 12 here has oppositely phased electric fields at its gaps 13, 14 while resonator 16 has like-phased fields at gaps 17, 18. The modulating voltage of frequency $\omega'$ may then be applied in opposite phase to these electrodes 36 and 37 by means of a suitable transformer 38 having an adjustable secondary winding center-tap 39 connected to ground.

The fact that such push-pull phase modulation will produce a carrier-suppressed output may be indicated analytically as follows:

Let it be assumed that the input wave to resonator 12 has the wave form $\cos \omega t$. The energy extracted from the beam at gap 17 may then have the wave form $$\cos (\omega t + m' \cos \omega't) \quad (1c)$$

which will be seen to be the well known expression for a phase modulated wave having a phase modulation factor $m'$. The energy extracted from the other beam at gap 18 will then have the wave form $$\cos [(\omega t+180°) + m' \cos (\omega't+180°)] \quad (2c)$$

since its velocity modulating field has opposite phase from that of the first beam, and since its modulating wave has opposite phase from that of the first beam.

A simple trigonometric expansion of these expressions (1c) and (2c) places them respectively in the forms:

$$J_0(m') \cos \omega t$$
$$-J_1(m') \sin (\omega+\omega')t - J_1(m') \sin (\omega-\omega')t$$
$$-J_2(m') \cos (\omega+2\omega')t - J_2(m') \cos (\omega-2\omega')t$$
$$+ \ldots \quad (1d)$$

and $$-J_0(m') \cos \omega t$$
$$-J_1(m') \sin (\omega+\omega')t - J_1(m') \sin (\omega-\omega')t$$
$$+J_2(m') \cos (\omega+2\omega')t + J_2(m') \cos (\omega-2\omega')t$$
$$+ \ldots \quad (2d)$$

where $J_0(m')$, $J_1(m')$, $J_2(m')$, etc., are the Bessel functions of order zero, one, two, etc., with argument $m'$. In each of these expressions (1d) and (2d), only the carrier component and the first and second sidebands have been expressed. However, it will be understood that a theoretically infinite number of sidebands is produced in accordance with well known phase modulation theory, but the amplitudes of the higher order sidebands usually decrease rapidly.

Since the resonator 16 is excited in like polarity at the two gaps 17 and 18 by the respective beams passing therethrough, its total amplitude of excitation is the sum of these expressions. Accordingly, neglecting third or higher order sidebands, the wave-form of the oscillations excited in resonator 16 is as follows:

$$-2J_1(m') \sin (\omega+\omega')t - 2J_1(m') \sin (\omega-\omega')t$$
$$= -4J_1(m') \cos \omega't \sin \omega t \quad (3d)$$

so that all carrier and even order sideband components cancel. This will be recognized as a carrier-suppressed wave with amplitude $4J_1(m')$. By suitable choice of $m'$, this amplitude may be maximized, if desired.

It will be seen that the carrier component and all even harmonic sidebands cancel, leaving only the odd harmonic sidebands. Since resonators of this type of resonator 16 have a relatively high merit factor or "Q," they can be designed to accept or resonate at the first sideband frequencies indicated by expression (3d), but to reject or substantially fail to oscillate at higher order sidebands differing more widely from the carrier frequency. Also, $m'$ may be selecting to make the third-order sideband frequency components have zero amplitude so that the frequency discrimination of the resonator need not be relied on to such an extent. In this manner, the device will produce a carrier-suppressed output in a manner similar to that of a balanced modulator, through the use of phase modulation alone.

It will be appreciated that the same results will be produced if resonator 12 oscillates with like-phased electric fields at its gaps 13 and 14, while resonator 16 oscillates with oppositely phased electric fields at its gaps 17 and 18.

Fig. 9 shows a modification of the device of Fig. 8, in which the phase modulation is produced by variation of accelerating voltage, instead of by use of the phase modulating electrodes 36, 37. In Fig. 9, the push-pull phase modulation is produced by means of a transformer 42 having a center-tapped secondary winding 43, whose respective secondary halves are connected in series with the respective cathodes 21 and 22 by the connection of center-tap 44 to battery 31. Thus, oppositely phased modulating voltages are impressed in series with the accelerating potentials applied to the cathodes 21 and 22. As discussed with respect to Fig. 1, this will also produce phase modulation. The circuit of Fig. 9 therefore will operate substantially identically to that of Fig. 8. Here again, resonators 12 and 16 should have different modes of oscillation, one having like-phased gap fields and the other having oppositely phased gap fields.

It will be appreciated that the devices of Figs. 8 and 9 may be operated with their resonators 12 and 16 oscillating in the same mode, provided the electron transit times through the respective drift tubes 19 and 20 are arranged to provide the half-cycle phase shift discussed relative to Fig. 6. This phase shift may be provided by connecting an auxiliary battery, similar to 31' of Fig. 6, in series with one cathode, or by use of auxiliary transit time control electrodes similar to 87 of Fig. 1, or by use of a split drift tube as described above.

The devices thus far described have all been carrier-suppression modulators. These same devices may also be utilized as frequency converters, changers, or shifters. Thus, if resonator 16 is selective enough in relation to the side band frequency components present in the electron beam currents, it may be tuned to one of these components. Then it will oscillate strongly at this one frequency and substantially not at all at others frequencies present in the beam currents.

The output derived from resonator 16 will therefore be essentially a single-sideband output, as shown in Fig. 7. If the modulating wave is a single frequency wave, this output will then be shifted in frequency with respect to the input frequency $\omega$ by the value of the modulating frequency $\omega'$. In the case of the phase modulation modifications, the output resonator may be tuned to a sideband of any order, to produce a frequency shift of a multiple of the frequency $\omega'$. By proper choice of the amplitude of the modulating voltage, the chosen sideband component may be maximized in amplitude.

It is also possible to produce a single sideband or frequency shifted output, without recourse to frequency discrimination between the sideband frequencies by resonator tuning, through the use of combined phase and amplitude modulation.

Figure 10:
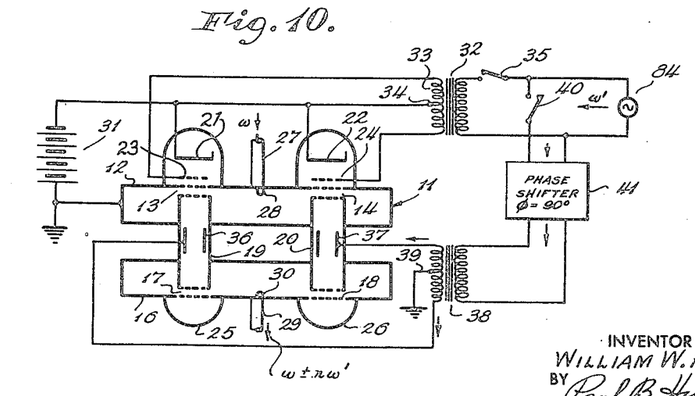

Such a system is shown in Fig. 10, in which push-pull amplitude modulation at the frequency $\omega'$ is produced in the manner shown in Fig. 4, while push-pull phase modulation at the same frequency $\omega'$ is produced in the same manner as in Fig. 8. It will be seen that with switch 35 opened and switch 40 closed the system is like that of Fig. 8, while with switch 35 closed and switch 40 open, the system is like Fig. 4. The phase-modulating voltage applied to electrodes 36 and 37 is preferably adjusted or selected to be in phase quadrature with respect to the modulating voltage simultaneously applied to amplitude modulating grids 23 and 24, as by the use of a suitable 90° phase shifter 41.

Resonator 12 oscillates with oppositely phased gap fields, while resonator 16 oscillates with like-phased gap fields.

The analytical expression or wave form for the oscillations excited in resonator 16 by the beam flowing from cathode 21 to the gap 17 may then be set forth as follows:

$$(1+m \cos \omega't) \cos [\omega t + m' \cos (\omega't-90°)] \quad (1e)$$

while the oscillations excited by the beam at gap 18 will be:

$$[1+m \cos (\omega't+180°)] \cos [(\omega t+180°) - m' \cos (\omega't-90°)] \quad (2e)$$

where $m$ and $m'$ are the amplitude and phase modulation factors, respectively. By suitable transformations, these two expressions can be written respectively as:

$$J_0 \cos \omega t + \left(\frac{1}{2}mJ_0 - J_1 + \frac{1}{2}mJ_2\right) \cos (\omega+\omega')t$$
$$+ \left(\frac{1}{2}mJ_0 + J_1 + \frac{1}{2}mJ_2\right) \cos (\omega-\omega')t$$
$$+ \left(-\frac{1}{2}mJ_1 + J_2 - \frac{1}{2}mJ_3\right) \cos (\omega+2\omega')t$$
$$+ \left(\frac{1}{2}mJ_1 + J_2 + \frac{1}{2}mJ_3\right) \cos (\omega-2\omega')t$$
$$- \ldots \ldots \quad (1f)$$

and $$-J_0 \cos \omega t + \left(\frac{1}{2}mJ_0 - J_1 + \frac{1}{2}mJ_2\right) \cos (\omega+\omega')t$$
$$+ \left(\frac{1}{2}mJ_0 + J_1 + \frac{1}{2}mJ_2\right) \cos (\omega-\omega')t$$
$$+ \left(\frac{1}{2}mJ_1 - J_2 + \frac{1}{2}mJ_3\right) \cos (\omega+2\omega')t$$
$$+ \left(-\frac{1}{2}mJ_1 - J_2 - \frac{1}{2}mJ_3\right) \cos (\omega-2\omega')t$$
$$- \ldots \ldots \quad (2f)$$

where here the argument of the Bessel functions is $m'$.

Upon adding these two expressions, since the oscillation amplitudes in resonator 16 is the sum of the amplitude excited in it by the two beams, it will be seen that the carrier component and even order sidebands cancel, while the two first order sideband components reinforce, yielding $$(mJ_0 - 2J_1 + mJ_2) \cos(\omega + \omega')t + (mJ_0 + 2J_1 + mJ_2) \cos(\omega - \omega')t \quad (3f)$$

It will be seen that the upper and lower first order sideband components no longer have equal amplitudes. In fact, their amplitudes now depend upon the amplitude modulation factor $m$. By suitably choosing or adjusting this modulation factor $m$ (as by adjusting or selecting the voltages applied to grids 23, 24), to have the value $$\frac{2J_1}{J_0 + J_2}$$

it will be seen that one first order sideband, for example, the upper sideband, having frequency $(\omega+\omega')$, is effectively neutralized and will not appear at all in the resonator 16, whose first order output will now represent a single-side-band-modulated wave. Similarly, if $m$ is made equal to $$\frac{-2J_1}{J_0 + J_2}$$

the lower sideband will be suppressed.

Since the value of each of these Bessel functions depends on the value of $m'$, any value of $m'$ may be used; whereupon $m$ may then be selected to have the values just discussed. In particular, $m'$ may be selected so that one of the third order sidebands, such as the one closest to the desired output frequency or sideband, can be eliminated entirely, as shown in Fig. 11, thus greatly simplifying any problems of frequency separation.

It will be clear that the device of Fig. 10 may also operate with resonator 12 arranged to oscillate with like phased gap fields, provided that resonator 16 then is arranged to oscillate with oppositely phased gap fields.

Figures 12, 13, 15:
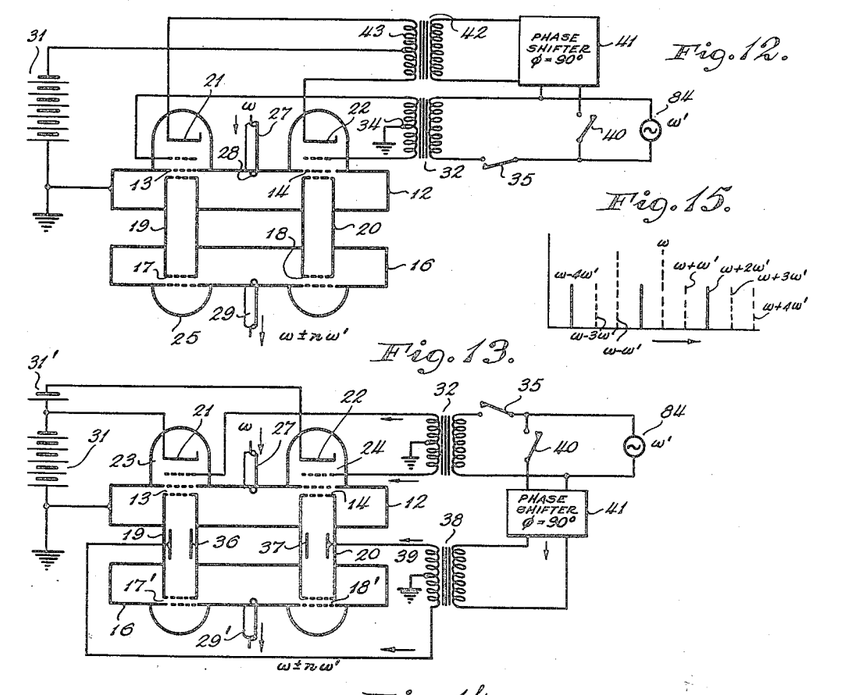
Figs. 12, 13 and 14 show schematic diagrams of still more embodiments of the invention.
Fig. 15 shows another explanatory frequency spectrum diagram.

The device of Fig. 10 may also operate with any suitable form of phase modulation. For example, as illustrated in Fig. 12, the type of phase modulation illustrated in Fig. 9 may be used. The system of Fig. 12 is otherwise the same as that described with respect to Fig. 10.

In addition, the devices of Figs. 10 and 12 may operate with resonators 12 and 16 arranged to oscillate in similar modes, provided a 180° phase shift at frequency $\omega$ is otherwise introduced, as in any of the ways described with respect to Fig. 6. One such system is illustrated in Fig. 13, using the auxiliary accelerating voltage source 31' in series only with cathode 22.

With this connection it may be necessary to supply unequal potentials to the modulating grids 23 and 24 from the transformer 43. This may be done by suitably positioning the variable tap 34' of the secondary of transformer 32. If necessary, the tap 39 of transformer 38 energizing the phase modulating electrodes 35 and 37, may be also suitably adjusted to provide proper operation. The operation of the device of Fig. 13 is therefore essentially identical to that of Figs. 10 and 12, and will produce the same results. Any other way of producing phase modulation may be used in place of that shown in Fig. 13.

Although the modifications described with respect to Figs. 10–13 have utilized a 90° phase shifter 41, it is to be understood that substantially the same results will be produced so long as this phase shift differs from zero or 180°. Accordingly other values of this phase shift may be used, as desired.

Although the invention has thus far been described with respect to double-beam electron discharge tubes, it is also adapted for use with similar devices having larger numbers of electron beams. Examples of such devices are described more in detail with respect to Figs. 3, 4, and 7 to 11, of my parent application Serial No. 451,796.

Figure 14:
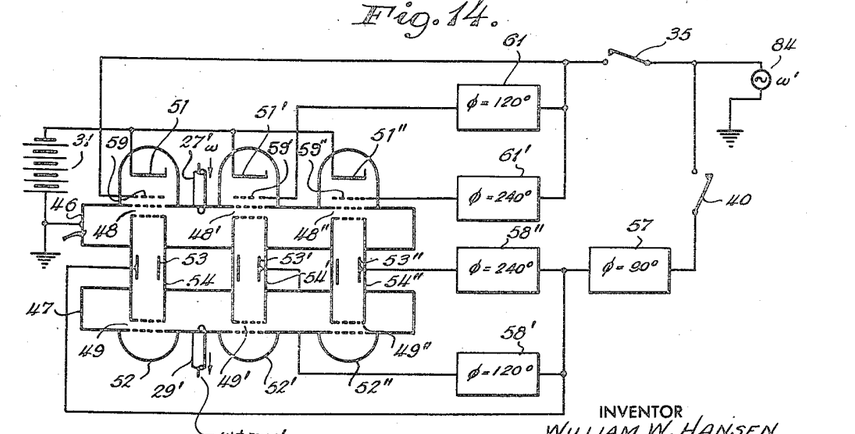

Fig. 14 shows schematically one form of the present invention using a triple beam tube. This tube has a pair of resonators 46 and 47, each of which has three electron permeable gaps indicated respectively at 48, 48', 48'', and 49, 49', 49''. These resonators are preferably of the type described with respect to Fig. 3 of my parent application Serial No. 451,796. Respective cathodes 51, 51', 51'', project respective electron beams through corresponding pairs of these gaps, such as 48 and 49, 48' and 49', and 48'' and 49'', respectively, which are separated by the respective drift tubes 54, 54', 54''. These electron beams may then be suitably collected, as by impinging upon the ends 52, 52', and 52'' of the device opposite the beams. A suitable accelerating battery 31 provides the accelerating voltage for these beams. Respective phase-modulating electrodes 53, 53', 53'' are placed within the corresponding drift tubes 54, 54' and 54'', joining the corresponding pairs of gaps of resonators 46 and 47.

As is discussed relative to Figs. 7 and 8 of my parent application Serial No. 451,796, resonators of the type of resonators 46 and 47 have three distinct modes of oscillation. For a particular resonant frequency, these modes depend on the configuration of the resonator and the type of coupling used with it. In the first mode (designated mode I), all three gaps have alternating electric fields which are in phase coincidence. In the second mode (mode II) the fields at the gaps have 120° phase differences, similar to a polyphase excitation, and with a predetermined phase rotation or order in which the fields reach their positive maxima. For mode II this phase rotation in resonator 46 may be gap 48, gap 48', gap 48'', in that order. In mode III, the same polyphase excitation exists, but with reverse phase rotation; that is, the phase rotation is 48, 48'', 48'. The modes for resonator 47 will be designated similarly.

Mode II and mode III have equal resonant frequencies for a particular resonator size and configuration of resonator. Mode I may be excited within resonator 46 in the manner shown in Fig. 7 of my parent application Serial No. 451,796. Mode II and mode III oscillations may be excited in resonator 46 by two coupling loops, one positioned as in parent Fig. 8 and the other positioned similarly but in 120° symmetry therewith, these two loops being energized with 120° phase difference at the resonant frequency $\omega$. Whether mode II or mode III is derived will depend on which of the two loops leads in phase of excitation with respect to the other.

Let it now be assumed that resonator 46 is energized to oscillate in mode II by its input connection 27' supplied from a suitable source of carrier frequency $\omega$, so that the oscillating high frequency fields at its respective gaps 48, 48', 48'' differ in phase from one another by 120°. Resonator 47 is arranged to oscillate in mode I, so that the electric fields at its gaps 49, 49', 49" can only be in phase coincidence at frequency ω or other output frequency. An output connection 29' is provided for resonator 47 in the manner indicated with respect to Fig. 7 of this prior parent application.

With switch 40 closed, the phase-modulating electrodes 53, 53' and 53" are energized with respective voltages of the modulating frequency ω', phase-shifted by 120° with respect to one another, from a source 84 of modulating frequency ω' connected to a conventional phase-shifter 57 producing a substantially 90° phase shift, for purposes later to be described. The output of phase-shifter 57 is connected directly to the modulation electrode 53, and to electrodes 53' and 53" through respective phase-shifters 58 and 58', producing phase shifts of 120° and 240°, respectively.

With switch 35 closed, the electron current-intensity controlling grids 59, 59' and 59" are supplied with voltages of the frequency ω' respectively phase-shifted 120° with respect to one another by the phase shifters 61 and 61'.

Assuming switch 35 closed, and switch 40 open, the respective beam currents at gaps 49, 49', 49" will be $$I_1 = (1+m \cos \omega' t) \cos \omega t \quad (4a)$$
$$I_2 = [1+m \cos (\omega' t - 120)] \cos (\omega t - 120) \quad (5a)$$
$$I_3 = [1+m \cos (\omega' t - 240)] \cos (\omega t - 240) \quad (6a)$$

which can also be written $$I_1 = \frac{m}{2} \cos (\omega - \omega') t + \cos \omega t + \frac{m}{2} \cos (\omega + \omega') t \quad (4b)$$

$$I_2 = \frac{m}{2} \cos (\omega - \omega') t + \cos (\omega t - 120) + \frac{m}{2} \cos [(\omega + \omega') t - 240] \quad (5b)$$

$$I_3 = \frac{m}{2} \cos (\omega - \omega') t + \cos (\omega t - 240) + \frac{m}{2} \cos [(\omega + \omega') t - 120] \quad (5c)$$

where $m$ is the amplitude modulation factor.

Upon addition, due to the additive excitation in resonator 47, only the lower sideband of frequency $\omega - \omega'$ survives, as shown in Fig. 7, so that again a single sideband output is produced, with no need for frequency separation.

The same result will be produced if resonators 46 and 47 are arranged to oscillate according to the following combinations of modes:

2. Resonator 46 in mode III and resonator 47 in mode I.
3. Resonator 46 in mode I and resonator 47 in mode II.
4. Resonator 46 in mode I and resonator 47 in mode III.

The same result will also be produced if resonators 46 and 47 are arranged to oscillate as follows:

5. Resonator 46 in mode I and resonator 47 in mode I.
6. Resonator 46 in mode II and resonator 47 in mode II.
7. Resonator 46 in mode III and resonator 47 in mode III, provided phase shifts of 120° between the currents of the beams at gaps 49, 49', 49" are also produced during transit of the electrons, as by individual adjustment or selection of accelerating voltages, or by separate transit time control electrodes in drift tubes 53, 53', 53", or by splitting drift tubes 53, 53', 53" and applying proper individual transit time control potentials thereto, in the manner discussed with respect to Fig. 6. The phase rotation of these transit time phase shifts is immaterial for conditions 5, 6, 7.

In all, seven types of operation are thus possible, the common characteristic of these modes being that the energies given up by the respective beams to the resonators shall have a progressive phase shift of $$\frac{360°}{3} = 120°$$

at the frequencies to be suppressed. These progressive phase shifts are determined, in the manner discussed above, by the excitation of the input resonator, by the phase shift during drift tube transit, and by the phases of the output resonator gaps.

Now assuming switch 35 to be open and switch 40 closed, the device of Fig. 14 will again produce a single sideband or frequency shifted output. The alternating current components of fundamental frequency in the bunched electron beams passing through the gaps 49, 49', 49" will have wave forms corresponding to the following expressions, when resonator 46 is in mode II and resonator 47 in mode I:

$$I_1 = \cos (\omega t - m' \sin \omega' t)$$
$$= J_0 \cos \omega t$$
$$-J_1 \cos (\omega + \omega') t + J_1 \cos (\omega - \omega') t$$
$$+J_2 \cos (\omega + 2\omega') t + J_2 \cos (\omega - 2\omega') t \quad (4)$$
$$-J_3 \cos (\omega + 3\omega') t + J_3 \cos (\omega - 3\omega') t$$
$$+ \ldots$$

$$I_2 = \cos [(\omega t - 120°) - m' \sin (\omega' t - 120)]$$
$$= J_0 \cos (\omega t - 120)$$
$$-J_1 \cos [(\omega + \omega') t + 240] + J_1 \cos (\omega - \omega') t$$
$$+J_2 \cos (\omega + 2\omega') t + J_2 \cos [(\omega - 2\omega') t + 120] \quad (5)$$
$$-J_3 \cos [(\omega + 3\omega') t - 120] + J_3 \cos [(\omega - 3\omega') t + 240]$$
$$+ \ldots$$

$$I_3 = \cos [(\omega t - 240°) - m' \sin (\omega' t - 240°)]$$
$$= J_0 \cos (\omega t - 240)$$
$$-J_1 \cos [(\omega + \omega') t - 120] + J_1 \cos (\omega - \omega') t$$
$$+J_2 \cos (\omega + 2\omega') t + J_2 \cos [(\omega - 2\omega') t + 240] \quad (6)$$
$$+J_3 \cos [(\omega + 3\omega') t - 240] + J_3 \cos [(\omega - 3\omega') t + 120]$$
$$- \ldots$$

where the argument of each of the Bessel functions $J_0, J_1, \ldots$ is the phase modulation factor $m'$. The excitation of resonator 47 by each of these beams will then have a corresponding wave form, so that the total excitation of resonator 47 by the three beams is represented by the sum of these wave forms. Upon adding the expressions (4), (5), and (6), it will be seen that the component of carrier frequency vanishes, as does the component of frequency $\omega + \omega'$ corresponding to the upper first order sideband. However, a component of frequency $\omega - \omega'$ corresponding to the lower first order sideband survives and reinforces, so that energy of this frequency may be abstracted from resonator 47 if tuned thereto.

Also, the lower second order sideband will vanish, leaving the upper second order sideband surviving. Also all third order sidebands vanish, and the fourth order lower sideband survives, while the fourth order upper sideband vanishes. In general, all sidebands whose order is a multiple of 3, vanish, while only one out of each pair of the remaining sidebands survives, as shown in Fig. 15. Accordingly, the surviving frequencies are separated by at least three times the modulating frequency $\omega'$. This separation is generally sufficient to provide complete discrimination between these separate surviving sidebands, so that by suitably tuning the resonator

47, output energy of a desired surviving sideband can be obtained while suppressing all other frequencies.

It is to be noted that the amplitudes of the sideband components depend on the value of the Bessel function $J_N$, where N is the sideband order. By a suitable choice of modulation factor $m'$, the desired sideband can be maximized as to amplitude. This may be done by adjusting the amplitude of the voltages applied to electrodes 53, 53', 53''.

The device of Fig. 14 using phase modulation only, as just described can also operate under situations 2 to 7 set forth above with respect to the amplitude modulation case, under the same conditions.

It will be understood that any type of phase modulation may be utilized here, including any of the forms discussed with respect to Figs. 1, 8 or 9, so long as the indicated phase relations between the modulations of the several beams are produced. For example, the modulating voltage may be impressed in series with the cathodes, or may be impressed between two portions of the drift tubes, where these are split into insulated portions.

The device of Fig. 14, as thus far described has operated only with amplitude or phase modulation of the recurrent bunching of the electron beams. However, an important feature of the present invention is the simultaneous phase and amplitude modulation of the beams at the same frequency $\omega'$, as discussed with respect to Figs. 10–13. With this type of operation both switches 35 and 40 are closed, and any one of the seven situations outlined above may be used.

It will be noted that by use of the phase-shifter 57, corresponding to phase shifter 41 of Figs. 10–13, each of the modulating voltages applied to the control grid 59, 59' and 59'' is phase-shifted 90° with respect to the corresponding voltages of the phase-modulating electrodes 53, 53' and 53''. This 90° phase shift is a desired value, producing optimum operation, but any phase shift other than zero or 180° may be used satisfactorily.

By virtue of this phase relation it can be shown, as already described with respect to Fig. 10, that, by proper choice of the phase and amplitude modulation factors, at least one of the surviving sideband frequencies of the device of Fig. 14 can also be suppressed while a particular sideband frequency can be maximized. This further assists in the separation of the resulting sideband frequencies and renders a desired sideband frequency more readily available.

The present invention need not be restricted to only two or three beams. In general, $n$ beams may be used, and according to at least four major types of operation. According to a first type of operation, each of the beams is velocity-modulated at the frequency $\omega$ with respective and progressive phase shifts of $$\frac{360°}{n}$$

and is phase and/or amplitude modulated at the modulating frequency $\omega'$, but with respective and progressive phase shifts also of $$\frac{360°}{n}$$

and with the same phase sequence. The beams then excite the output resonator with like phases of electric fields at its gaps.

By a second type of operation, the beams are velocity modulated with progressive phase shifts of $$\frac{360°}{n}$$

at the frequency $\omega$, and are phase and/or amplitude modulated at the frequency $\omega'$ with the same progressive phase shift of $$\frac{360°}{n}$$

A further progressive $$\frac{360°}{n}$$

phase shift at frequency $\omega$ and with the same phase sequence is produced during transit of the beam between the input and output resonators, in any of the ways discussed above. The output resonator then is made to oscillate with the same phase rotation as the first velocity modulation.

In the third and fourth types of operation, the beams are velocity modulated with like phase at frequency $\omega$, and are phase and/or amplitude modulated with progressive phase shift of $$\frac{360°}{n}$$

at frequency $\omega'$ and with the same phase sequence. In the third type, zero transit time phase shift is used, with progressive $$\frac{360°}{n}$$

phase shift of immaterial phase sequence at the output gaps. In the fourth type, progressive phase shifts of $$\frac{360°}{n}$$

at frequency $\omega$ is provided by different transit times or otherwise, and energy extraction by fields of like phase is performed by the output gaps.

Many other types of operation are also possible, especially where $n$ is greater than 3. For such larger values of $n$ there are many possible phase sequences of both the input and output resonators. For an arbitrary combination of a velocity modulation phase sequence and an output gap phase sequence, ordinarily a progressive transit time phase shift will not eliminate all neighboring sidebands except the desired one. In such a case, the individual beam transit times should be adjusted so that a progressive phase shift of the excitations of the output resonator by the respective beams at the frequencies to be cancelled is produced.

By simultaneously amplitude and phase modulating the beams by the same modulating frequency $\omega'$ having corresponding phase shifts $$\frac{360°}{n}$$

for the respective beams, further sideband frequencies can be eliminated, rendering it much easier to produce any desired output frequency.

Fig. 16 shows an arrangement which can take the place of the input resonator 12 and its source in any of the above-described modifications. This arrangement is illustrated for two-pole resonators, but may be used with any number of poles. Here, in place of the input resonator 12, a pair of resonators 90 and 91 separated by drift tubes 92, 92' are used. These resonators are coupled together by a feedback coupling 93, and are tuned to the frequency $\omega$ so that self-sustained oscillations are produced. The beam issuing from resonator 91 may then be utilized in the same manner as the beam issuing from any of the input resonators 12 or 46 in the above-described modifications.

In each of the above modifications the output resonator may be tuned to a side frequency or sideband of a harmonic of the frequency ω, so that greater frequency shifts are derived, the output frequency then having a value $pω±nω'$, where $p$ is any positive integer except zero.

In all the above embodiments of the invention, the production of the bunched beam at the gaps of the output resonator may be accomplished by use of suitable high frequency density modulation control grids energized in the indicated phase of frequency ω, in place of the input resonators. In such a case, no velocity modulation is employed. The circuits described will operate to produce the same results.

Also in place of the plural-pole resonators, an equivalent number of independent resonators tuned to the same frequency and preferably tightly coupled to one another, may be used. Such resonators can be excited in the same polyphase or like-phase fashion as the multi-pole resonators described above.

It is to be understood that the use of a single modulating frequency $ω'$ in the above analysis is for illustration only. In general, the modulating potentials may have any desired complex wave form, such as voice currents, and may have a complete band of frequency components.

Although the invention has been described with respect to phase modulation of the beam of electrons, it is to be understood that any type of modulation adapted to produce a plurality of equally separated side frequencies may be used. These types include pure phase modulation or pure frequency modulation, or any combination of the two, as well as non-linear phase or frequency modulation or any combinations thereof. Since each of these forms of modulation is independent of the amplitude of the carrier wave, the term "amplitude-independent modulation" will be used to indicate any of the forms. Where a plurality of side frequencies is not desired, amplitude modulation may be used.

The term "progressive phase shift" for a set of $n$ waves or $n$ alternating quantities as used in the present specification or claims is meant to apply to the situation where said $n$ waves or quantities have respective phases, with relation to a datum, of $$\frac{360° m}{n}, 2\left(\frac{360° m}{n}\right), 3\left(\frac{360° m}{n}\right), \cdots (n-1)\left(\frac{360° m}{n}\right), 360° m$$

where $m$ is any positive integer greater than or equal to unity.

In this manner the principles of the present invention may be applied to produce extremely useful balanced modulators or single-sideband modulators or frequency-changers for ultra high frequencies.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a balanced modulator utilizing a high frequency electron discharge tube structure, an electron beam velocity modulating vacuum tube device having a pair of cathodes for emitting a pair of electron beams, means to modulate each beam with the same signal and with a phase difference of 180°, a buncher cavity resonator, and a catcher cavity resonator, reentrant portions and grids for each beam, means to excite the buncher resonator with a high frequency field, and means connected with the velocity modulating vacuum tube device whereby the energy abstracted from the catcher resonator suppresses an input frequency.

2. In a balanced modulator utilizing a high frequency electron discharge tube structure, an electron beam velocity modulating vacuum tube device having a pair of cathodes for emitting a pair of electron beams, means to modulate the beam with the same signal, a buncher cavity resonator, and a catcher cavity resonator, reentrant portions and grids for each beam, means to excite the buncher resonator with a high frequency field to velocity modulate the beams with a phase difference of 180°, means to accelerate the electrons in one of said beams so that the flight time of the electrons between the grids is substantially an integral number plus one quarter cycles of the bunched resonator frequency, and means to abstract energy from the catcher resonators whereby one of the input frequencies is suppressed.

3. In a balanced modulator utilizing a high frequency electron discharge tube structure, an electron beam velocity modulating vacuum tube device having a pair of cathodes for emitting a pair of electron beams, means to modulate each beam with the same signal but with 180° phase difference, a buncher cavity resonator, and a catcher cavity resonator, reentrant portions and grids for each beam, means to excite the buncher resonator with a high frequency field and in a mode so that each field has a phase difference of 180°, means to accelerate the electrons from one of said cathodes so that the flight time of the electrons between the grids is substantially an integral number plus one quarter cycles of the buncher resonator frequency, and means to abstract energy from the catcher resonators whereby the input frequencies are suppressed.

4. In a balanced modulator utilizing a high frequency electron discharge tube structure, an electron beam velocity modulating vacuum tube device having a pair of cathodes for emitting a pair of electron beams, means to modulate each beam with the same signal, a buncher cavity resonator, and a catcher cavity resonator, reentrant portions and grids for each beam, means to excite the buncher resonators with a high frequency field in a mode so that each beam has a phase difference of 180°, and means connected with the catcher resonator to abstract energy therefrom in a different mode from that in which the buncher resonator is excited whereby one of the input frequencies is suppressed.

5. In a balanced modulator utilizing a high frequency electron discharge tube structure, an electron beam velocity modulating vacuum tube device having a pair of cathodes for emitting a pair of electron beams, means to modulate each beam with the same signal, a buncher cavity resonator, and a catcher cavity resonator tuned to one side frequency, reentrant portions and grids for each beam, means to excite the buncher resonator with a high frequency field, one of the aforesaid means controlling the electron beams in a mode so that each beam has a phase difference of 180°, means connected with the catcher resonators to abstract energy therefrom in a different mode from that in which the buncher resonators are excited whereby one of the input frequencies and a side frequency is suppressed.

6. In a balanced modulator utilizing a high frequency electron discharge tube structure, an electron beam velocity modulating vacuum tube device having a pair of cathodes for emitting a pair of electron beams, means to modulate each beam from the two cathodes with the same signal but with a phase difference of 180°, a buncher cavity resonator, and a catcher cavity resonator, means to excite the buncher resonator with a high frequency field and in a mode so that each field has a phase difference of 180°, and means connected with the catcher resonator to abstract energy therefrom in a different mode from that in which the buncher resonator is excited whereby the input frequencies are suppressed.

7. A balanced modulator comprising an electron-velocity-modulating vacuum tube device having means for producing more than two electron beams of number $n$; a buncher cavity resonator aligned with and adapted to be traversed by said beams; means connected to said resonator providing substantially field-free individual passages for each of said beams; means in said buncher resonator for exciting said buncher resonator to produce an ultra-high frequency field of predetermined frequency value with regions of said field traversed by said respective beams having respective phase differences of $$\frac{360°}{n}$$

for corresponding velocity-modulation of said beams; further means in the paths of said beams for modulating each of said beams with the same signal having respective phase differences of $$\frac{360°}{n}$$

and catcher resonator means connected to said passages for extracting energy conjointly from each of said beams with said predetermined frequency value and one sideband substantially suppressed.

8. A balanced modulator comprising an electron beam velocity-modulating vacuum tube device having a plurality of cathodes of number $n$ and each emitting an electron beam, means in the path of each of said beams to modulate each such beam with phase-displaced versions of the same signal having respective phase differences of $$\frac{360°}{n}$$

a buncher cavity resonator and a catcher cavity resonator each having reentrant portions respectively surrounding each of said beam paths and grids in said reentrant portions, said reentrant portions and grids defining respective drift spaces surrounding said beam paths between said resonators, means to excite said buncher resonator to produce respective high frequency fields at each reentrant portion of the same frequency and with respective phase differences of $$\frac{360°}{n}$$

and means in said drift spaces energizable for producing a phase displacement of $$\frac{360°}{n}$$

of each said beam in its respective drift space.

9. A balanced modulator comprising an electron-velocity-modulating vacuum tube device having means for producing three electron beams; a buncher cavity resonator and a catcher cavity resonator, each of said resonators being aligned with and adapted to be traversed by said beams; means defining substantially field-free individual passages for each of said beams and interconnecting said resonators; means in said buncher resonator for exciting said buncher resonator to produce an ultra-high-frequency field of predetermined frequency value with regions of said field traversed by said respective beams having respective phase differences of 120°; further means in the paths of said beams for modulating each of said beams with the same signal having respective phase differences of 120°; means coupled to each of said beams for producing a phase displacement of 120° of each beam in its respective passage; and means including said catcher resonator for extracting energy conjointly from each of said beams with said predetermined frequency value and one sideband substantially suppressed.

10. High frequency discharge apparatus comprising two cavity resonators for containing oscillating electromagnetic fields and located in axial consecution, said resonators having a plurality of aligned recesses, an electron gun means for producing a plurality of electron beams and projecting each of said beams through said respective recesses, whereby the field of the first of said regions acts to vary the velocity of the electrons of each of the said beams, and a modulator having a plurality of output waves each having the same frequency with progressive phase shifts for modulating said beams.

11. High frequency electron discharge apparatus comprising means for producing a plurality of electron beams, means disposed along the paths of said beams for simultaneously and periodically varying the velocity of the electrons of each of said beams, means in said apparatus for modulating said beams by the same modulating signal having progressive phase shift, and means along the paths of said beams and positioned beyond said velocity-varying means for extracting energy simultaneously from said beams.

12. High frequency electron discharge apparatus comprising means for producing a plurality of electron beams, means along the paths of said beams for simultaneously and periodically varying the velocity of the electrons of said beams, said periodic velocity variations having equally separated phases, means in said apparatus for modulating said beams with the same signal with equally separated phases, and means along the paths of said beams and disposed beyond said velocity-varying means for extracting energy from all of said beams.

13. High frequency apparatus comprising means for producing a plurality of beams of electrically charged particles, means along the paths of said beams for periodically varying the velocity of the particles of each of said beams simultaneously and in equal phase relationship, means in said apparatus for modulating said beams with the same signal and with equally separated phases, and means along the paths of said beams and disposed beyond said velocity-varying means for extracting energy from all of said beams.

14. High frequency electron discharge apparatus comprising means for producing a plurality of electron beams, means adjacent one end of the paths of said beams for simultaneously and periodically varying the velocities of the electrons of each of said beams, means in said apparatus for modulating said beams with the same signal and with progressive phase shifts, and means adjacent the other end of the paths of said beams for simultaneously extracting energies of respectively different phases from said respective beams.

15. High frequency electron discharge apparatus comprising, an electron gun means for producing a plurality of electron beams, a periodic electron velocity modulator cooperating with said guns for varying the velocity of each of said beams, a modulator means connected to receive the outputs of said velocity modulator and having a predetermined frequency with progressive phase shifts for varying each of said beams, and energy abstracting means for obtaining electromagnetic energy from each of said beams.

16. High frequency electron discharge apparatus, comprising an electron gun means for producing a plurality of electron beams, a first cavity resonator located in axial consecution and having a plurality of reentrant portions, each defining an electron permeable gap and registering with each of said beams, a second cavity resonator also located in axial consecution and also having a plurality of reentrant portions, each defining an electron permeable gap registering with each of said beams, each of said electron beams passing successively through a respective gap of said first resonator and a respective gap of said second resonator, and a modulator means for modulating the beams with the same signal.

17. High frequency electron discharge apparatus as in claim 16, further comprising means for exciting said first resonator to provide a corresponding plurality of electric field portions at the gaps of said first resonator and having substantially equal phase.

18. High frequency electron discharge apparatus as in claim 16, further including means for exciting said first resonator to produce a corresponding plurality of electric field portions at said gaps having respectively different and equally spaced phases.

19. A high frequency modulator comprising means for producing a pair of electron beams, means for velocity modulating said beams simultaneously and in opposite phase by a high frequency wave, means for causing said velocity modulated beams to become bunched, means for modulating said beams in opposite phase by a modulation signal, and means for extracting amplified energy in opposite phase from said bunched beams.

20. A high frequency modulator comprising means for producing a pair of electron beams, means for velocity modulating said beams simultaneously and in opposite phase by a high frequency wave, means for causing said velocity modulated beams to become bunched and for phase shifting one of said bunched beams relative to the other to produce simultaneous bunching of said beams, means for modulating said beams in opposite phase by a modulation signal, and means for extracting amplified energy in like phase from said bunched beams.

21. High frequency apparatus comprising means for producing a plurality of electron beams, means in the path of said beams for velocity modulating all of said beams at the same ultra high frequency and with predetermined phase relation, means defining field-free spaces through which said modulated beams respectively pass with predetermined transit times, means defining ultra high frequency fields coupled respectively to said beams for extracting ultra high frequency energy therefrom and having predetermined phase relation, said extracting means also serving to combine all said extracted energies, and means in said apparatus for simultaneously amplitude-independently and amplitude modulating said beams by the same modulation signal and with equal and progressive phase shifts, said amplitude-independent modulation being in phase quadrature with respect to said amplitude modulation and the velocity modulation phase transit time, and energy extracting field phase for each of said beams being selected so that, for predetermined side band components of said ultra high frequency modulated by said modulation signal, the energies extracted from said beams have a progressive phase shift whereby said predetermined side band components are cancelled from said combined energy.

22. Apparatus as in claim 21, wherein said velocity modulation means includes means for effecting a progressive phase shift between consecutive beams.

23. Apparatus as in claim 21, wherein said energy extracting fields have a progressive phase shift between consecutive fields.

24. High frequency apparatus comprising a pair of cavity resonators each having an equal plurality of reentrant portions defining electron permeable gaps, field-free means connecting each gap of one of said resonators with a corresponding gap of the other of said resonators, means for producing a plurality of electron beams and for projecting each of said beams successively through a first resonator gap, a field-free space, and a second resonator gap, the field at said first gap velocity modulating said beam, said field-free space serving to transform said velocity modulation into current modulation, and the field at said second gap serving to extract energy from said current-modulated beam, means in said apparatus for modulating the intensity of said beams with a modulation signal and with a progressive phase shift, and means for amplitude-independently modulating each of said beams by said signal in phase quadrature to the intensity modulation thereof.

25. The method of modifying high frequency energy comprising the steps of producing a plurality of electron beams, simultaneously and periodically varying the velocity of the electrons of each of said beams by said high frequency energy to suppress the carrier frequency, modulating said beams by the same modulating signal, and combining and extracting energy in a composite form simultaneously from said modulated beams.

26. The method of modifying high frequency energy comprising the steps of producing a plurality of electron beams, simultaneously and periodically varying the velocity of the electrons of said beams by respective equally separated phase-displaced versions of said high frequency energy, modulating said beams respectively with progressively phase-displaced versions of the same modulating signal suppressing of the carrier frequency and emphasizing predetermined side band frequencies, and combining and extracting energy in composite form simultaneously from all of said modulated beams.

27. The method of modifying high frequency energy comprising the steps of producing a plurality of electron beams, periodically varying the velocity of the electrons of each of said beams simultaneously and cophasally by said high frequency energy to suppress the carrier frequency, modulating said beams with respective progressively phase-displaced versions of a modulating signal, and combining and extracting energy in composite form from all of said modulated beams to obtain predetermined side band frequencies.

28. The method of modifying high frequency energy comprising the steps of producing a plurality of electron beams, simultaneously and periodically varying the velocities of the electrons of each of said beams by said high frequency energy, modulating said beams respectively with progressively phase-shifted versions of a modulated signal, suppressing the carrier frequency, simultaneously extracting energies of respectively different phases from said respective modulated beams, and combining said extracted energies.

29. The method of modifying high frequency energy comprising the steps of producing a plurality of electron beams, periodically varying the velocities of electrons of each of said beams by said high frequency energy, modulating said beams respectively with progressively phase-shifted versions of a modulating signal, combining energy in like phase from each of said modulated beams and extracting said combined energies.

30. High frequency modulator apparatus comprising hollow resonator means adapted to contain an oscillating electromagnetic field, means for maintaining oscillations in said resonator including means for directing a plurality of streams of electrons along a plurality of discharge paths through said resonator, means coupled to each of said beams for producing a phase displacement of each stream along its respective path, means for modulating said streams with respectively phase-shifted versions of the same modulation signal and means including a catcher resonator for extracting energy conjointly from each of said streams.

31. Apparatus as defined in claim 30, wherein said modulating means comprises a source of modulating potential and means coupling said source to each of said beams for shifting the phase of respective ones of said beams by equal amounts given by $$\frac{360°}{n}$$

where $n$ is the number of said plurality of beams.

32. High frequency modulator apparatus comprising, a hollow electromagnetic resonator having a plurality of aligned discharge paths through said resonator, a plurality of streams of electrons registering with said discharge paths and directed therethrough to energize said resonator into electromagnetic oscillations, and a modulator having respectively phase-shifted versions of a predetermined frequency signal for modulating said beams.

WILLIAM W. HANSEN.

REFERENCES CITED

The following references are of record in the file of this patent:

UNITED STATES PATENTS

| Number | Name | Date |
|---|---|---|
| 1,901,605 | Loewe | Mar. 14, 1933 |
| 2,239,421 | Haeff | Apr. 22, 1941 |
| 2,252,565 | Haeff | Aug. 12, 1941 |
| 2,280,824 | Hansen et al. | Apr. 28, 1942 |
| 2,317,140 | Gibson | Apr. 20, 1943 |
| 2,329,780 | Zalesak | Sept. 21, 1943 |
| 2,338,237 | Fremlin | Jan. 4, 1944 |
| 2,381,320 | Tawney | Aug. 7, 1945 |
| 2,407,667 | Kircher | Sept. 17, 1946 |

---

Certificate of Correction

Patent No. 2,500,945                                March 21, 1950

WILLIAM W. HANSEN

It is hereby certified that errors appear in the printed specification of the above numbered patent requiring correction as follows:

Column 6, line 61, for "a gap" read *at gap*; column 14, line 37, for that portion of the equation reading "t+240]" read *t−240]*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*